United States Patent
Recio et al.

(10) Patent No.: US 8,122,225 B2
(45) Date of Patent: Feb. 21, 2012

(54) LUN MASKING/MAPPING IN A SR-IOV ENABLED SAS ADAPTER

(75) Inventors: Renato J. Recio, Austin, TX (US);
Aaron Ches Brown, Austin, TX (US);
Douglas M. Freimuth, New York, NY (US); James A. Pafumi, Leander, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 12/190,018

(22) Filed: Aug. 12, 2008

(65) Prior Publication Data
US 2010/0042805 A1 Feb. 18, 2010

(51) Int. Cl.
*G06F 12/02* (2006.01)
(52) U.S. Cl. .................. 711/221; 711/E12.014
(58) Field of Classification Search .......... 711/221, 711/E12.014
See application file for complete search history.

(56) References Cited

U.S. PATENT DOCUMENTS

| | | | |
|---|---|---|---|
| 6,298,428 B1 | 10/2001 | Munroe | |
| 6,934,799 B2 | 8/2005 | Acharya | |
| 7,149,873 B2 | 12/2006 | Mohideen | |
| 7,813,366 B2 * | 10/2010 | Freimuth et al. | 370/419 |
| 2004/0117596 A1 | 6/2004 | Henry | |
| 2006/0053251 A1 | 3/2006 | Nicholson | |
| 2006/0190685 A1 | 8/2006 | Arndt | |
| 2006/0195626 A1 | 8/2006 | Arndt | |
| 2006/0200636 A1 | 9/2006 | Kano | |
| 2006/0248047 A1 * | 11/2006 | Grier et al. | 707/2 |
| 2007/0073782 A1 | 3/2007 | Nakatani | |

FOREIGN PATENT DOCUMENTS

JP 2001142752 A 5/2001

* cited by examiner

*Primary Examiner* — Yong Choe
(74) *Attorney, Agent, or Firm* — Yee & Associates, P.C.; David A. Mims, Jr.; Rudolf O. Siegesmund

(57) ABSTRACT

A "LUN Table" enables Logical Unit Number (LUN) mapping/masking within an Input/Output Virtualization IOV adapter included in a Serial Attached Small Computer System Interface ("SAS" or "Serial Attached SCSI"). A plurality of System Images ("SI") share block storage through the SAS. The IOV adapter includes one or more Virtual Functions (VF), a Physical Function (PF), and a LUN Table within the PF. The VF allows each SI to communicate I/O requests with a storage device through the PF. The LUN Table maps the I/O requests to unique locations within the storage device. Each SI is isolated from all other SIs. Interference between each SI is avoided. A VIOS or a LUN mapping/masking SAN are not required. I/O latency, processor overhead and storage cost are improved over prior LUN mapping/masking solutions.

17 Claims, 5 Drawing Sheets

LUN MASKING/MAPPING IN A SR-IOV ENABLED SAS ADAPTER

FIELD OF THE INVENTION

A method and system for managing access to block storage by System Images and for providing access to the block storage Input/Output Virtualization (IOV) hardware.

BACKGROUND OF THE INVENTION

The Peripheral Component Interconnect Special Interest Group (PCI SIG) Workgroup developed a specification that adds I/O virtualization (IOV) capability to PCIe Single Root IOV (SR-IOV) Serial Attached SCSI (SAS) adapters. IOV allows an Input/Output (I/O) device, for example a storage device, to be shared by a plurality of System Images (SI).

Modern computing and storage systems increasingly use IOV to manage IT resources through load balancing. An IOV adapter has a Base Function (BF), a Physical Function (PF) and a Virtual Function (VF). The BF manages the Multi-Root (MR) features of a MR device. The PF contains Native Single-Root IOV ("SR-IOV") functionality. The VF is a function associated with the PF that shares one or more physical resources with the PF and other VFs associated with the same PF. These components logically connect an SI to a storage device. Native IOV requires a PCI Manager (SR-PCIM or MR-PCIM) to perform PCIe fabric discovery. A MR device also requires a PCI Manager to implement Multi-Root Aware ("MRA") components. Each MR-PCIe root complex has its own Virtual Hierarchy ("VH").

For a SR-IOV Serial Attached SCSI (SAS) adapter, the SAS feature provides persistent storage, but it does not optimize the utilization of this persistent storage by an SI. In addition, the typical SR-IOV SAS enabled adapter does not prevent one SI from accessing the data storage of another SI.

A known method of preventing one SI from accessing the data storage of another System Image is Logical Unit Number (LUN) Masking and Mapping. LUNs convert storage into logical storage space and differentiate between different blocks of storage. The System Image must not access or recognize other LUNs that have been assigned to other System Images. LUN Masking and Mapping prevents a server from corrupting disks or other storage belonging to other servers. For example, Windows servers attached to a Storage Area Network (SAN) will occasionally corrupt non-Windows (Unix, Linux, NetWare) storage on the SAN by attempting to write Windows storage labels to them.

One method for connecting a client having a plurality of System Images to a storage device using LUN Masking and Mapping is illustrated in FIG. 1B. This solution requires the use of a hypervisor 130. The hypervisor 130 is typically in the form of firmware. The client includes a plurality of System Images ($SI_0$ to $SI_{n-1}$) 116, 117, and 118. The hypervisor 130 connects port 140 to Virtual I/O System (VIOS) 145. The client issues I/O requests 135, 136, 137 from each SI 116, 117, 118 to the VIOS 145 through hypervisor 130 and port 140. The VIOS forwards these I/O requests through a network connection or "fabric" 125 to the correct block storage in a storage device 120. The fabric 125 is part of the hypervisor 130 in this example. The block storage can be one or more LUNs on a SAN appliance, an internal adaptor, or other construct built on the LUNS. Unfortunately, this approach increases the path length I/O latency and processor usage. The user is also required to maintain and manage the VIOS.

SAN storage devices 121 with built in LUN masking capabilities may be used in combination with an IOV adapter 150 as illustrated in FIG. 1C. In this example, each SI 116, 117, 118 initiates its I/O request 135, 136, 137 through a corresponding Virtual Function ($VI_0$ to $VI_{n-1}$) 145, 146, 147 to the Physical Function (PF) 148 of the IOV adapter 150. This example improves the system of FIG. 1B. In this example, the VIOS is eliminated and the hypervisor is not required for the fabric 125. I/O path length and latency are similar to a direct connection to a storage device. Unfortunately, such storage devices are expensive. They also require the user to maintain and manage the LUN Masking and Mapping on the storage device 121.

A novel method and apparatus is needed to perform LUN Masking and Mapping within a PCIe SR-IOV enabled SAS adapter without the need for a VIOS, a hypervisor, or a storage area network appliance.

SUMMARY OF THE INVENTION

A "LUN Table" enables Logical Unit Number (LUN) mapping/masking within an IOV adapter on a Serial Attached Small Computer System Interface ("SAS" or "Serial Attached SCSI"). Multiple System Images ("SI") share block storage through the SAS. The LUN Table assures that multiple System Image (SI) data is selectively and securely routed to and from storage without interference between different SIs. The SI data is sent via input/output (I/O) requests through an Input/Output Virtual (IOV) Adapter. The IOV adapter includes one or more Virtual Functions (VF), a Physical Function (PF), and the programmable LUN Table. An SI communicates with a corresponding VF. The VF interfaces with the PF. The PF contains the LUN Table. The LUN Table designates specific block storage locations for each SI within a storage device. The stored data for each SI is isolated from the stored date for every other SI. A VIOS, a hypervisor supplied fabric, or a complex and expensive SAN are not required. A programming interface allows for the set up or modification of the LUN Table.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1A:
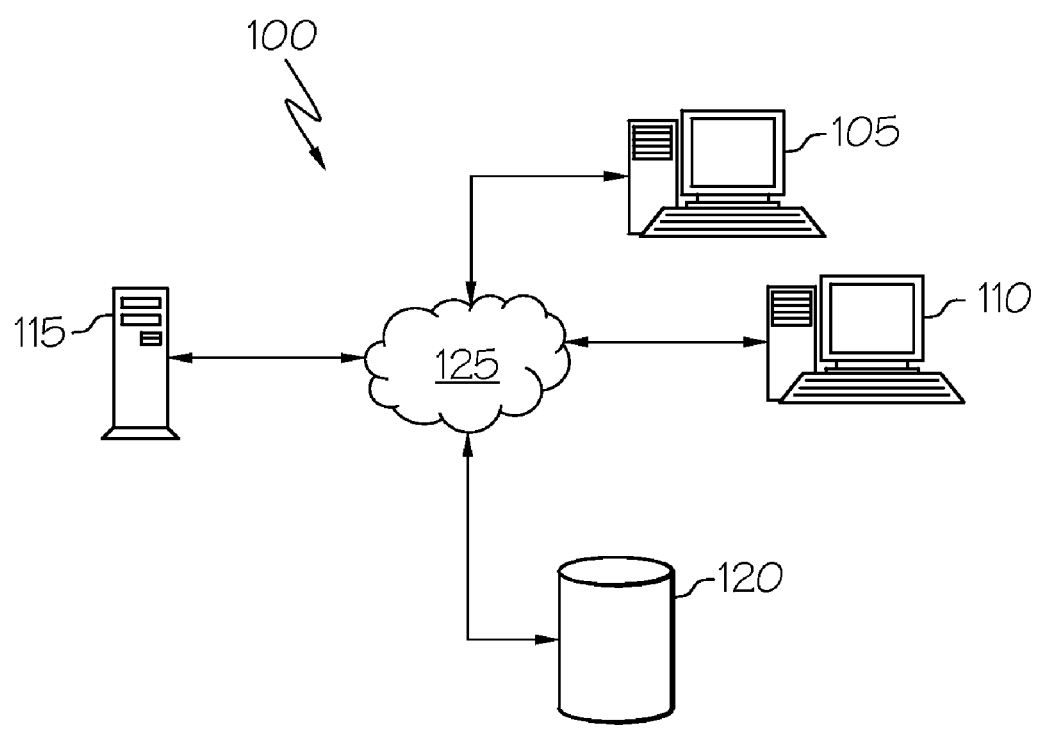
FIG. 1A depicts a schematic diagram of an exemplary computer network system.
Figure 1B:
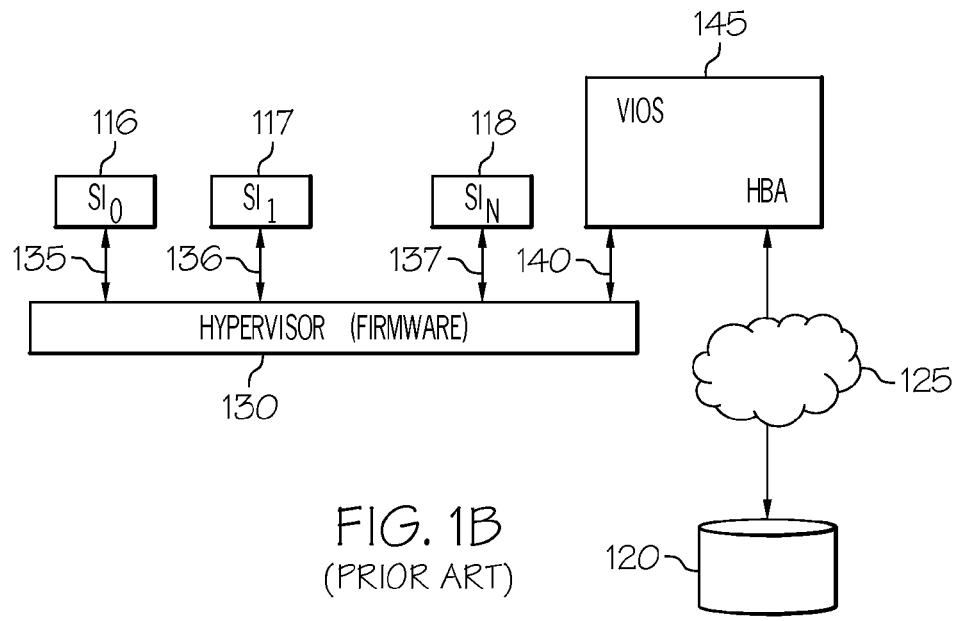
FIG. 1B depicts a known method for implementing LUN Mapping and Masking.
Figure 1C:
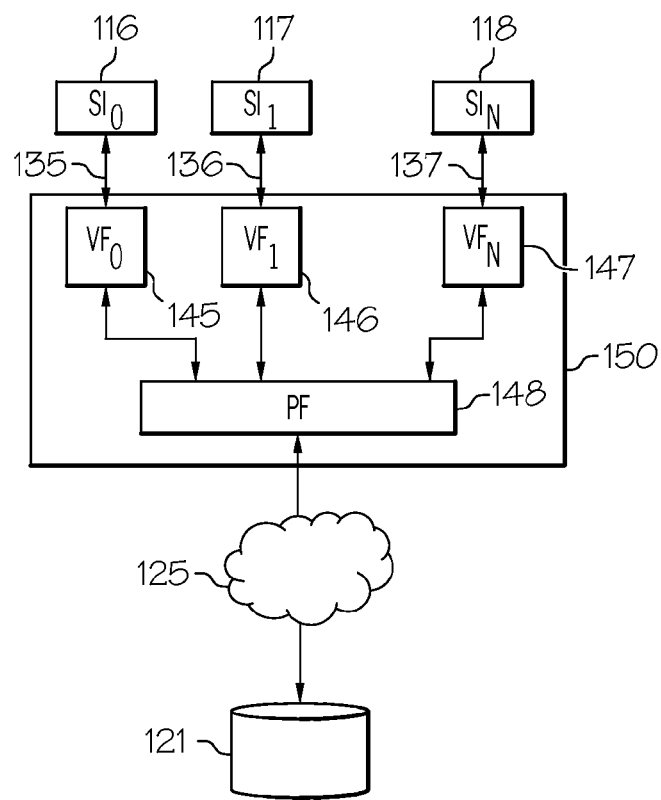
FIG. 1C depicts another known method for using the LUN Mapping and Masking capabilities of a SAN.

A person of ordinary skill in the art will appreciate that the present invention may be implemented in a variety of software and hardware configurations. It is believed, however, that the invention is described best as a computer program that configures and enables one or more general-purpose computers to implement the novel aspects of the invention.

"Computer hardware" or "hardware," refers to any machine or apparatus that is capable of accepting, performing logic operations on, storing, or displaying data, and includes without limitation processors, memory and other physical devices.

"Computer software" or "software," refers to any set of instructions operable to cause computer hardware to perform an operation. Software includes a "computer program" or "program."

A "computer," includes any useful combination of hardware and software.

A "computer program" or "program" includes any software operable to cause computer hardware to accept, perform logic operations on, store, or display data. A computer program may, and often is, comprised of a plurality of smaller programming units, including without limitation subroutines, modules, functions, methods, and procedures. The functions of a computer program may be distributed among a plurality of computers and computer programs.

A "client initiator" includes any device that requests input/output (I/O) operations.

"Input/Output (I/O)" includes any data transfer to or from a computer.

An "Input/Output Virtualization (IOV) adapter" means a hardware adapter capable of being shared by multiple System Images. The hardware is a collection of Virtual Functions and Physical Functions. An IOV adapter implements Serial Attached SCSI (SAS) for persistent storage.

A "Logical Unit Number (LUN)" means a logical entity that converts storage into logical storage space. LUNs differentiate between different blocks of storage.

"Persistent storage" means the ability of a device to maintain data even when the device is turned off.

A "Physical Function (PF)" is a component of IOV hardware that allows connectivity to storage, but does not provide a direct method for an SI to initiate an I/O request. The SI communicates through a VF to the PF.

A "Physical Identification (PID)" is an element of the LUN Table used to identify a physical data storage segment within a persistent storage device.

A "Physical LUN (PLUN)" is an element of the LUN Table used to identify a physical location for a data storage logical unit within a persistent storage device.

A "root complex" means the beginning of the connection from the I/O or I/O system to the CPU and memory.

A "System Image (SI)" includes both an operating system, and an operating system in combination with applications.

A "$SI_n$" is the $n^{th}$ selected System Image among a plurality of System Images $SI_0$ to $SI_{n-1}$.

A "storage device" means a computing device for storage-related functions.

A "Virtual Function (VF)" is a component of an IOV hardware adapter that provides sufficient logical capabilities to allow an SI to communicate through the PF.

A "$VF_n$" is the $n^{th}$ selected Virtual Function among a plurality of Virtual Functions $VF_0$ to $VF_{n-1}$.

A "Virtual Identification (VID)" is an element of the LUN Table used to logically identify a physical block data storage location.

A "Virtual LUN (VLUN)" is an element of the LUN Table used to logically identify a logical unit of data storage.

An exemplary network of computer hardware, is depicted in FIG. 1A. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including nodes for a workstation computer 105, a workstation computer 110, a server computer 115, and a persistent storage 120. A Network connection 125 comprises all hardware, software, and communications media necessary to enable communication between network nodes 105-120. Unless otherwise indicated in context below, all network nodes use publicly available protocols or messaging services to communicate with each other through network connection (or "fabric") 125.

Figure 2A:
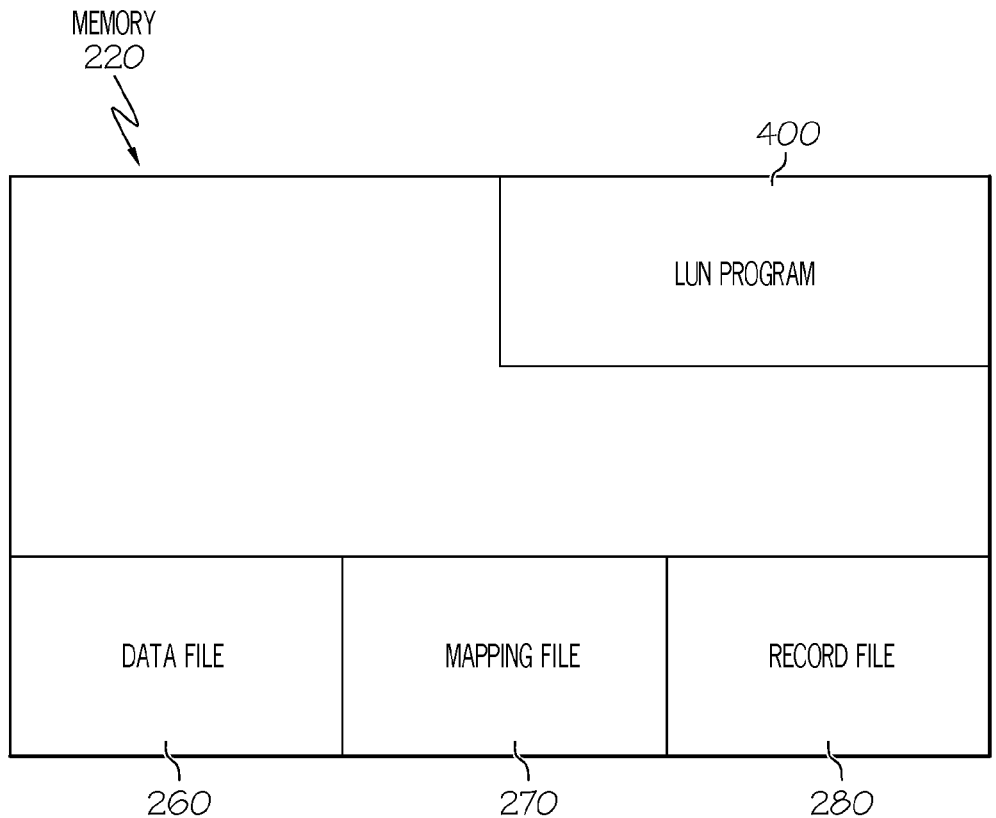
FIG. 2A depicts a schematic diagram of a computer memory containing the LUN Table and associated data files.

The LUN Table 360 is typically stored in a memory 220 as schematically illustrated in FIG. 2A. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, LUN Table 360 may reside in more than one memory distributed across different computers, servers, logical partitions, or other hardware devices. The elements depicted in memory 220 may be located in or distributed across separate memories in any combination, and LUN Table 360 may be adapted to identify, locate, and access any of the elements and coordinate actions, if any, by the distributed elements. Thus, FIG. 2A is included merely as a descriptive expedient and does not necessarily reflect any particular physical embodiment of memory 220. As depicted in FIG. 2A, though, memory 220 may include additional data and programs. Of particular import to the LUN Table 360, memory 220 includes "LUN Program 400, "Data File" 260, "Mapping File" 270, and a "Record File" 280. As illustrated, LUN Program 400 accepts programming instructions for the LUN Table 360. The LUN Program 400 may use and record data in a Data File 260 and a Record File 280 to generate LUN Table mapping instructions in a Mapping File 270. LUN Table 360 may be implemented as computer software, or it may be implemented as firmware stored in a computer hardware device, including an IOV Adapter as described below.

Figure 2B:
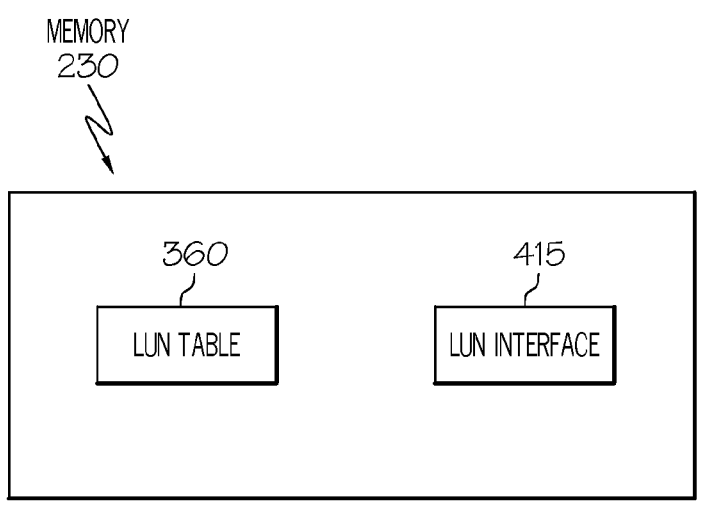
FIG. 2B depicts a schematic diagram of a memory associated with an IOV for receiving LUN Table programming instructions and data.

FIG. 2B depicts another memory 230 associated with an IOV Adapter. Memory 230 receives LUN Table mapping instructions through a LUN Interface 410. The LUN Interface 410 populates the data points in the LUN Table 360.

Figure 3:
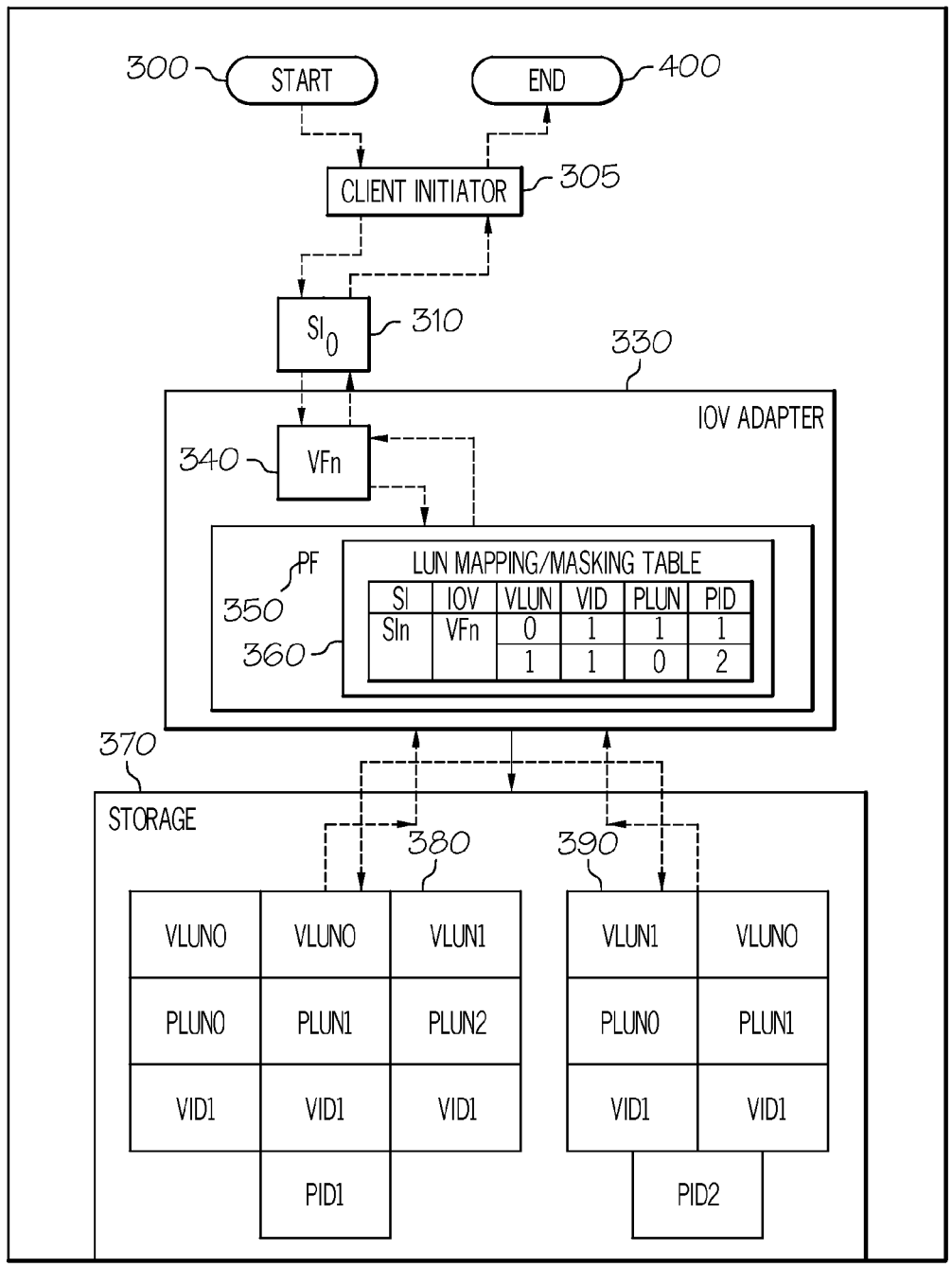
FIG. 3 depicts a schematic diagram of the LUN Table within an IOV adapter for mapping System Image (SI) data to a persistent storage appliance.

FIG. 3 a schematic flow diagram of LUN Table 360 deployed within an IOV Adapter 330 to implement SAS for persistent storage 370 for multiple System Images ($SI_n$) 310. The IOV Adapter 330 may be included within a PCIe Manager. The masking/mapping starts (300) when Initiator 305 issues an I/O request to $SI_n$ 310. $SI_n$ 310 data is sent via input/output requests through Input/Output Virtual (IOV) Adapter 330. IOV Adapter 330 includes one or more Virtual Functions (VF) 340, a Physical Function (PF) 350, and a LUN Table 360. These components communicate to ensure secure storage and retrieval for $SI_n$ 310, within storage appliance 370. $SI_n$ 310 communicates via input/output requests with $VF_n$ 340. $VF_n$ 340 allows $SI_n$ 310 to initiate communication through PF 350. PF 350 provides a specific connection with Storage Appliance 370. LUN Table 360 designates specific storage locations within Storage Appliance 370 for $SI_n$ 310. $SI_n$ 310 data is stored within Storage Appliance 370, in designated discrete physical and virtual logical units $PLUN_n$ and $VLUN_n$. In the example of FIG. 3, VLUN0 is associated with PLUN1 and VID1 is associated with PID1 380, and VLUN1 associated with PLUN0 and VID1 is associated with PID2 390. The designation of specific storage locations by a LUN Table 360 prevents interference or distortion of $SI_n$ 310 data by other System Images.

The exemplary LUN mapping/masking table 360 is reproduced from FIG. 3 in the following Table 1:

TABLE 1

| System Image (SI) | IOV Function | Virtual LUN (VLUN) | Virtual ID (VID) | Physical LUN (PLUN) | Physical ID (PID) |
|---|---|---|---|---|---|
| n | $VF_n$ | 0 | 1 | 1 | 1 |
|   |   | 1 | 1 | 0 | 2 |

In this example the LUN Table represents the $n^{th}$ System Image or $SI_n$ and $n^{th}$ Virtual Function or $VF_n$. In practice, Table 1 includes data points for each Virtual Function $VF_0$ to $VF_{n-1}$. Each $VF_n$ is represented by two rows of data points as illustrated in Table 1 and FIG. 3.

The I/O requests from each $SI_n$ 310 are mapped to a protected block 380, 390 of storage device 370. The response to the requests is returned by the same path to the $SI_n$ 310. The system enters and exits through the Client Initiator 305. The association of VLUN, VID, PLUN and PID illustrated in FIG. 3 and Table 1 is by way of example to show how LUN table 360 may be populated to define associations. These associations may be hardwired, contained in firmware or "flash" memory, or they may be programmed by an administrator. These associations may also be adjusted by other software or hardware if necessary for fault correction or system optimization as long as the isolation of each $SI_n$ is maintained.

Figure 4:
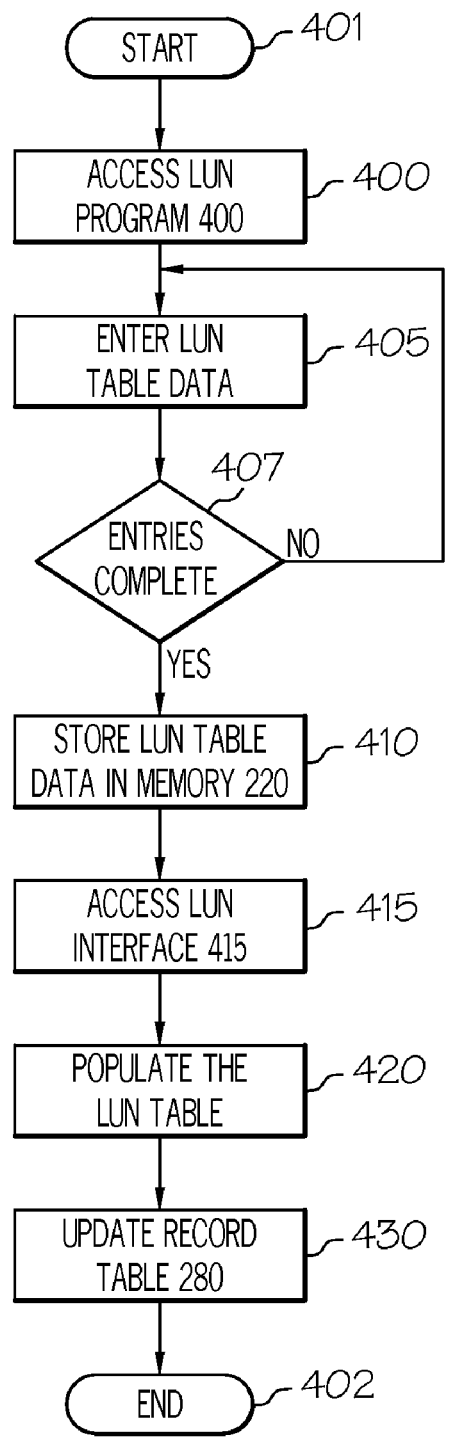
FIG. 4 depicts exemplary programming and logic for the LUN Table.

The LUN Table 360 may be pre-programmed as illustrated in FIG. 4. Programming starts (401) by accessing the LUN Program 400 stored in Memory 220 (400). LUN Data Points are entered into the Data File 260 of Memory 220 (405) until the LUN Data Points entry is complete (407). When all of the LUN Data Points are entered, the updated LUN Table Data is stored in a Mapping File 270 on Memory 220 (410). Memory 220 accesses the LUN Interface 415 of Memory 230 (415). The stored LUN Table 360 is populated with the stored LUN Table Data through the LUN Interface 415 (420). The Record File 280 on memory 220 is updated with the new LUN Table version 280 (430) and the LUN Program ends (403). The programming of the LUN Table may be hard wired, contained in a flash or other persistent memory, or enabled by software. The programming software may include automated steps to modify the LUN Table in response to changing system requirements.

It will be understood from the foregoing that various modifications and change may be made in the preferred embodiment of the present invention by those skilled in the art without departing from its true spirit. It is intended that this description is for purposes of illustration only and should not be construed in a limiting sense. The scope of the invention should be limited only by the language of the following claims.

What is claimed is:

1. A programmable apparatus for preventing interference between a plurality of System Images in a computer, comprising:
   a programmable hardware connected to a memory;
   a program stored in the memory;
   a computer having a plurality of System Images;
   a storage device having a plurality of storage locations for receiving a data request from each of the plurality of System Images;
   an Input/Output Virtualization Adapter having a plurality of Virtual Functions, a Physical Function, and a Logical Unit Number Table contained within the Physical Function, for routing the data request from each of the plurality of System Images to the storage device;
   wherein the program directs the programmable hardware to perform steps comprising:
   associating a Virtual Function with each of the plurality of System Images, wherein each of the plurality of System Images is associated with a unique Virtual Function;
   receiving a plurality of data requests from the plurality of System Images through the unique Virtual Function associated with each System Image;
   routing the plurality of data requests from each unique Virtual Function to the Physical Function;
   using the Logical Unit Number Table, assigning a unique storage location on the storage device for each of the plurality of System Images;
   routing the plurality of data requests from the Physical Function to each unique storage location; and
   storing the plurality of data requests in the plurality of storage locations, wherein the data request associated with each System Image is securely stored in the unique storage location and isolated from the data requests associated with every other System Image.

2. The programmable apparatus of claim 1, wherein each unique storage location is associated with a Logical Unit Number, and the Input/Output Virtualization adapter is associated with a Serial Attached Small Computer System Interface.

3. The programmable apparatus of claim 2 wherein the Logical Unit Number comprises a plurality of Virtual Logic Unit Numbers, a plurality of Physical Logical Unit Numbers, a plurality of Virtual Identification tags, and a plurality of Physical Identification tags.

4. The programmable apparatus of claim 3, wherein the data requests include Input and Output data requests.

5. The programmable apparatus of claim 4, wherein the storage device is a persistent storage device.

6. The programmable apparatus of claim 2, wherein each unique storage location ensures that each System Image will recognize all Logical Unit Numbers associated with the System Image, but not recognize the Logical Unit Numbers associated with other System Images.

7. A computer implemented process for preventing interference between a plurality of System Images on a computer, comprising:
   using a computer, performing the following series of steps:
   accessing an Input/Output Virtualization Adapter having a plurality of Virtual Functions, a Physical Function, and a Logical Unit Number Table contained within the Physical Function, for routing a data request from each of the plurality of System Images to a storage device;
   associating a Virtual Function with each of the plurality of System Images, wherein each System Image is associated with a unique Virtual Function;
   receiving a plurality of data requests from the plurality of System Images through the unique Virtual Function associated with each System Image;
   routing the plurality of data requests from each unique Virtual Function to the Physical Function;

using the Logical Unit Number Table, assigning a unique storage location on the storage device for each of the plurality of System Images;

routing the plurality of data requests from the Physical Function to each unique storage location; and storing the plurality of data requests in a plurality of storage locations;

whereby the data request associated with each System Image is securely stored in the unique storage location and isolated from the data requests associated with every other System Image.

8. The computer implemented process of claim 7, wherein each unique storage location is associated with a Logical Unit Number, and the Input/Output Virtualization adapter is associated with a Serial Attached Small Computer System Interface.

9. The computer implemented process of claim 8 wherein the Logical Unit Number comprises a plurality of Virtual Logic Unit Numbers, a plurality of Physical Logical Unit Numbers (PLUN), a plurality of Virtual Identification tags, and a plurality of Physical Identification tags.

10. The computer implemented process of claim 9, wherein the data requests include Input and Output data requests.

11. The computer implemented process of claim 10, wherein the storage device provides a persistent storage.

12. The computer implemented process of claim 8, wherein each unique storage location ensures that each System Image will recognize all of the Logical Unit Numbers associated with the System Image, but not recognize any of the Logical Unit Numbers associated with other System Images.

13. A computer program product for causing a computer to prevent interference between a plurality of System Images on a computer, comprising:

one or more computer readable, tangible storage devices;

program instructions, stored on at least one of the one or more computer-readable, tangible storage devices, to access an Input/Output Virtualization Adapter having a plurality of Virtual Functions, a Physical Function, and a Logical Unit Number Table contained within the Physical Function, for routing a data request from each of the plurality of System Images to a storage device;

program instructions, stored on at least one of the one or more computer-readable, tangible storage devices, to access associating a Virtual Function with each of the plurality of System Images wherein each System Image is associated with a unique Virtual Function;

program instructions, stored on at least one of the one or more computer-readable, tangible storage devices, to receive a plurality of data requests from the plurality of System Images through the unique Virtual Function associated with each System Image;

program instructions, stored on at least one of the one or more computer-readable, tangible storage devices, to route the plurality of data requests from each unique Virtual Function to the Physical Function;

program instructions, stored on at least one of the one or more computer-readable, tangible storage devices, to use the Logical Unit Number Table to assign a unique storage location on a storage device for each of the plurality of System Images;

program instructions, stored on at least one of the one or more computer-readable, tangible storage devices, to route the plurality of data requests from the Physical Function to each unique storage location; and program instructions, stored on at least one of the one or more computer-readable, tangible storage devices, to store the plurality of data requests in a plurality of storage locations;

whereby the data request associated with each System Image is securely stored in the unique storage location and isolated from the data requests associated with every other System Image.

14. The computer program product of claim 13, wherein the Input/Output Virtualization Adapter comprises a single root input/output virtualization capable Small Computer System Interface adapter, and the Logical Unit Number table is implemented within the Small Computer System Interface adapter.

15. The computer program product of claim 13, wherein each unique storage location is associated with a Logical Unit Number, and the Input/Output Virtualization adapter is associated with a Serial Attached Small Computer System Interface.

16. The computer product of claim 15, wherein the Logical Unit Number comprises a plurality of Virtual Logic Unit Numbers, a plurality of Physical Logical Unit Number, a plurality of Virtual Identification tags, and a plurality of Physical Identification tags.

17. The computer program product of claim 16, wherein each unique storage location ensures that each System Image will recognize all of the Logical Unit Numbers associated with the System Image, but not recognize any of the Logical Unit Numbers associated with other System Images.

* * * * *